(12) United States Patent  
Marom et al.

(10) Patent No.: US 8,576,323 B2
(45) Date of Patent: Nov. 5, 2013

(54) OPTICAL IMAGING SYSTEM WITH AN EXTENDED DEPTH-OF-FIELD AND METHOD FOR DESIGNING AN OPTICAL IMAGING SYSTEM

(75) Inventors: Emanuel Marom, Tel Aviv (IL); Eyal Ben-Eliezer, Kiryat Ono (IL); Naim Konforti, Holon (IL); Benjamin Milgrom, Netanya (IL)

(73) Assignee: RAMOT at Tel Aviv University Ltd., Tel Aviv (IL)

( * ) Notice: Subject to any disclaimer, the term of this patent is extended or adjusted under 35 U.S.C. 154(b) by 909 days.

(21) Appl. No.: 12/581,191

(22) Filed: Oct. 19, 2009

(65) Prior Publication Data

US 2010/0097487 A1 Apr. 22, 2010

Related U.S. Application Data

(63) Continuation-in-part of application No. PCT/IL2008/000527, filed on Apr. 17, 2008.

(60) Provisional application No. 60/912,702, filed on Apr. 19, 2007.

(51) Int. Cl.
*H04N 5/225* (2006.01)
*H04N 5/228* (2006.01)

(52) U.S. Cl.
USPC .......... 348/342; 348/222.1; 348/340

(58) Field of Classification Search
USPC .................. 348/340, 342
See application file for complete search history.

(56) References Cited

U.S. PATENT DOCUMENTS

| | | | | |
|---|---|---|---|---|
| 6,317,261 | B1 * | 11/2001 | Otaki | 359/387 |
| 6,525,302 | B2 * | 2/2003 | Dowski et al. | 250/201.2 |
| 6,899,424 | B2 * | 5/2005 | Miller et al. | 351/159.02 |
| 6,969,003 | B2 * | 11/2005 | Havens et al. | 235/462.22 |
| 7,115,849 | B2 * | 10/2006 | Dowski et al. | 250/201.9 |
| 7,158,317 | B2 * | 1/2007 | Ben-Eliezer et al. | 359/738 |
| 7,812,295 | B2 * | 10/2010 | Zalevsky et al. | 250/201.2 |
| 7,933,010 | B2 * | 4/2011 | Rahn et al. | 356/213 |
| 8,212,914 | B2 * | 7/2012 | Chiu | 348/345 |
| 8,331,030 | B2 * | 12/2012 | Liege et al. | 359/618 |
| 8,460,374 | B2 * | 6/2013 | Christie et al. | 623/5.12 |
| 2006/0204861 | A1 * | 9/2006 | Ben-Eliezer et al. | 430/5 |

* cited by examiner

*Primary Examiner* — Ngoc-Yen Vu
(74) *Attorney, Agent, or Firm* — Oren Reches

(57) ABSTRACT

A method for designing a mask, the method includes: choosing or receiving a desired contrast value; and determining sizes, locations and shapes of multiple rotationally symmetric regions of a mask such as to define a modulation transfer function that is characterized by a substantially uniform response over a spatial frequency range; wherein the uniform response is substantially indifferent to an orientation of features of the object and to a location of the object within a deep depth-of-field region. An optical imaging system that includes: a mask that includes multiple rotationally regions; wherein the multiple rotationally symmetric regions are shaped and positioned such as to define a modulation transfer function that is characterized by a substantially uniform response over a spatial frequency range, wherein the uniform response is substantially indifferent to an orientation of features of the object and to a location of the object within a deep depth-of-field region.

7 Claims, 15 Drawing Sheets

14

Sensing light from an object wherein the light propagates through at least one lens and through a mask towards to a sensor. The mask includes multiple rotationally symmetrical elements. The multiple rotationally symmetrical elements are shaped and positioned such as to define a modulation transfer function that is characterized by a substantially uniform response over a spatial frequency range wherein the uniform response is substantially indifferent to an orientation of features of the object and to a location of the object within a deep depth-of-field region. 120

Imaging an object (located at an object space) onto a sensor and acquiring an image by the sensor. 110

Electrically processing an image acquired by the sensor such as to increase a contrast of the acquired image. 130

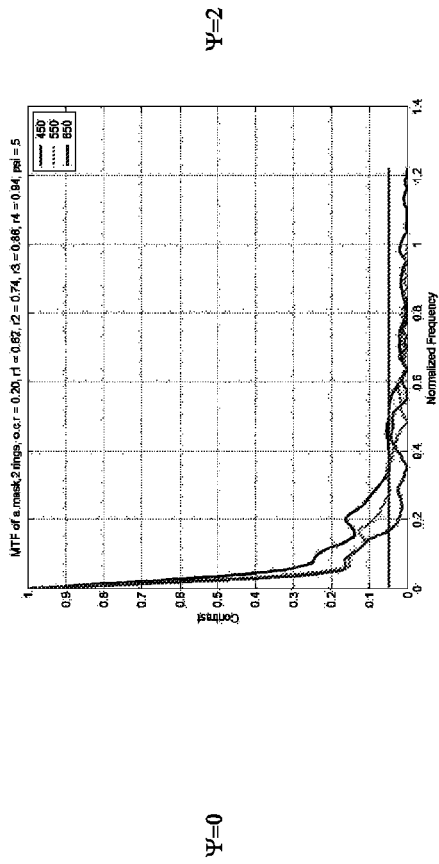
Figure 11a
Figure 11b
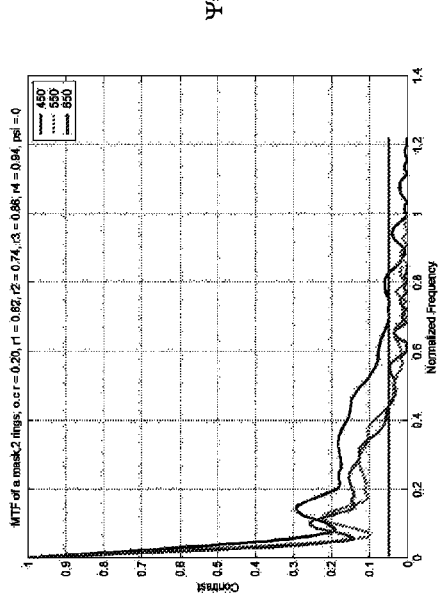
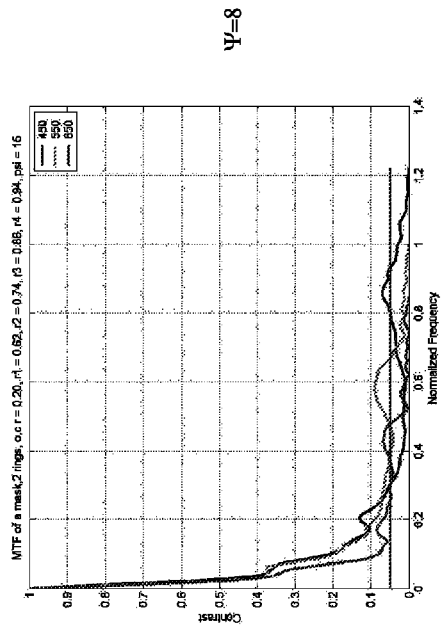
Figure 11c
Figure 11d
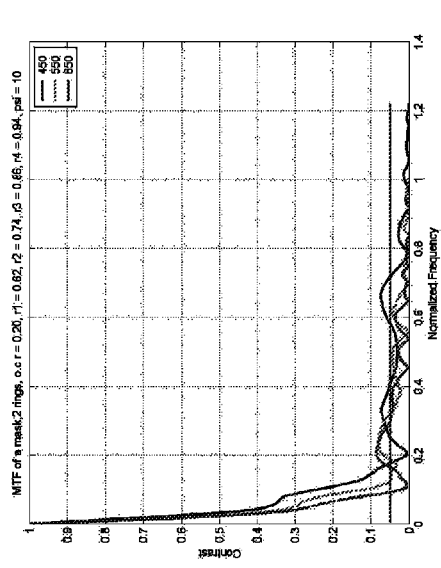

OPTICAL IMAGING SYSTEM WITH AN EXTENDED DEPTH-OF-FIELD AND METHOD FOR DESIGNING AN OPTICAL IMAGING SYSTEM

CROSS-REFERENCE TO RELATED APPLICATIONS

This application claims benefit from U.S. Provisional Patent Ser. No. 60/912,702, entitled "OPTICAL IMAGING SYSTEM WITH AN EXTENDED DEPTH-OF-FIELD AND METHOD FOR DESIGNING AN OPTICAL IMAGING SYSTEM", filed on Apr. 19, 2007, which is incorporated in its entirety by reference herein. This application is also a continuation-in-part of PCT International Application Number PCT/IL2008/000527, entitled "OPTICAL IMAGING SYSTEM WITH AN EXTENDED DEPTH-OF-FIELD AND METHOD FOR DESIGNING AN OPTICAL IMAGING SYSTEM", International Filing Date Apr. 17, 2008 which is incorporated in its entirety by reference herein.

FIELD OF THE INVENTION

The present invention relates to an optical imaging system with an extended depth-of-field and to a method for designing such an optical imaging system.

BACKGROUND OF THE INVENTION

Optical imaging systems are very sensitive to defocus and as such, perfect alignment of object and image location is crucial. Aberration correction of optical lenses used in imaging systems compensates for effects, such as spherical aberration, coma, chromatic effects, and field curvature but are unable to cope with defocus effects that usually are more severe than any other aberration.

US patent application 2003/0063384 of Dowski Jr., PCT patent application WO2006/018834 of Zalevsky and PCT patent application WO2006/097916 of Ben-Eliezer et al. illustrate optical imaging systems with extended depth-of-field. US patent application 2004/0114103 of Miller et al. describes a system and method for increasing the depth of focus of the human eye.

The quality of an image acquired by an imaging system is responsive to multiple factors, including the orientation of features of an object (positioned at an object space) that is imaged onto a light sensitive sensor.

There is a need to provide robust imaging systems and methods, and especially robust imaging systems and methods that are characterized by an extended depth-of-field and as such are not sensitive to the exact position of objects (or scenes) that have to be imaged.

SUMMARY OF THE INVENTION

An optical imaging system that includes a mask that includes multiple rotationally symmetrical regions; wherein the multiple rotationally symmetrical regions are shaped and positioned such as to define a modulation transfer function that is characterized by a substantially uniform response over a spatial frequency range, wherein the substantially uniform response is substantially indifferent to an orientation of features of the object and to a location of the object within a deep depth-of-field region.

A mask, including multiple rotationally symmetric regions; wherein the multiple rotationally symmetric regions are shaped and positioned such as to define a modulation transfer function that is characterized by a substantially uniform response over a spatial frequency range regardless of an orientation of features in an object space.

According to an embodiment of the invention the mask may be designed by selecting, out of the multiple possible mask configurations, a selected mask configuration that is characterized by a highest among the minimal spatial cut-off frequencies that assure the desired contrast for the depth-of-field region.

According to an embodiment of the invention the mask may be designed by finding, for each possible mask configuration out of multiple possible mask configurations, minimal spatial cut-off frequencies that provide at least the desired contrast for the whole depth-of-field range, for multiple wavelengths and/or wavelength ranges; and selecting, out of the multiple possible mask configurations, a selected mask configuration that is characterized by a highest value of the minimal spatial cut-off frequency that provides at least the desired contrast for the whole depth-of-field range, for the different wavelengths.

A method for generating an image, the method includes: sensing light from an object, wherein the light propagates through at least one lens and through a mask towards to a sensor; wherein the mask includes multiple rotationally symmetric regions, wherein the multiple rotationally symmetric regions are shaped and positioned such as to define a modulation transfer function that is characterized by a substantially uniform response over a spatial frequency range wherein the uniform response is substantially indifferent to an orientation of features of the object and to a location of the object within a deep depth-of-field region.

A method for designing a mask, the method includes: receiving a desired contrast value and a desired depth of field; and determining sizes, locations and shapes of multiple rotationally symmetric regions of a mask such as to define a modulation transfer function that is characterized by a substantially uniform response over a spatial frequency range; wherein the uniform response is substantially indifferent to an orientation of features of the object and to a location of the object within a deep depth-of-field region.

A mask design system, including: a memory unit adapted to store a desired contrast value; and a processor that is adapted to determine sizes, locations and shapes of multiple rotationally symmetric regions of a mask such as to define a modulation transfer function that is characterized by a substantially uniform response over a spatial frequency range; wherein the uniform response is substantially indifferent to an orientation of features of the object and to a location of the object within a deep depth-of-field region. Conveniently, the determining provides the maximal spatial frequency range in which at least the desired contrast value is provided for the whole depth of field region.

SHORT DESCRIPTION OF THE DRAWINGS

The present invention will be understood and appreciated more fully from the following detailed description taken in conjunction with the drawings in which:

FIG. 1 schematically illustrates an imaging system according to an embodiment of the invention;

FIG. 4 is a flow chart of a method for acquiring and exhibiting an image, according to an embodiment of the invention;

Figure 9:
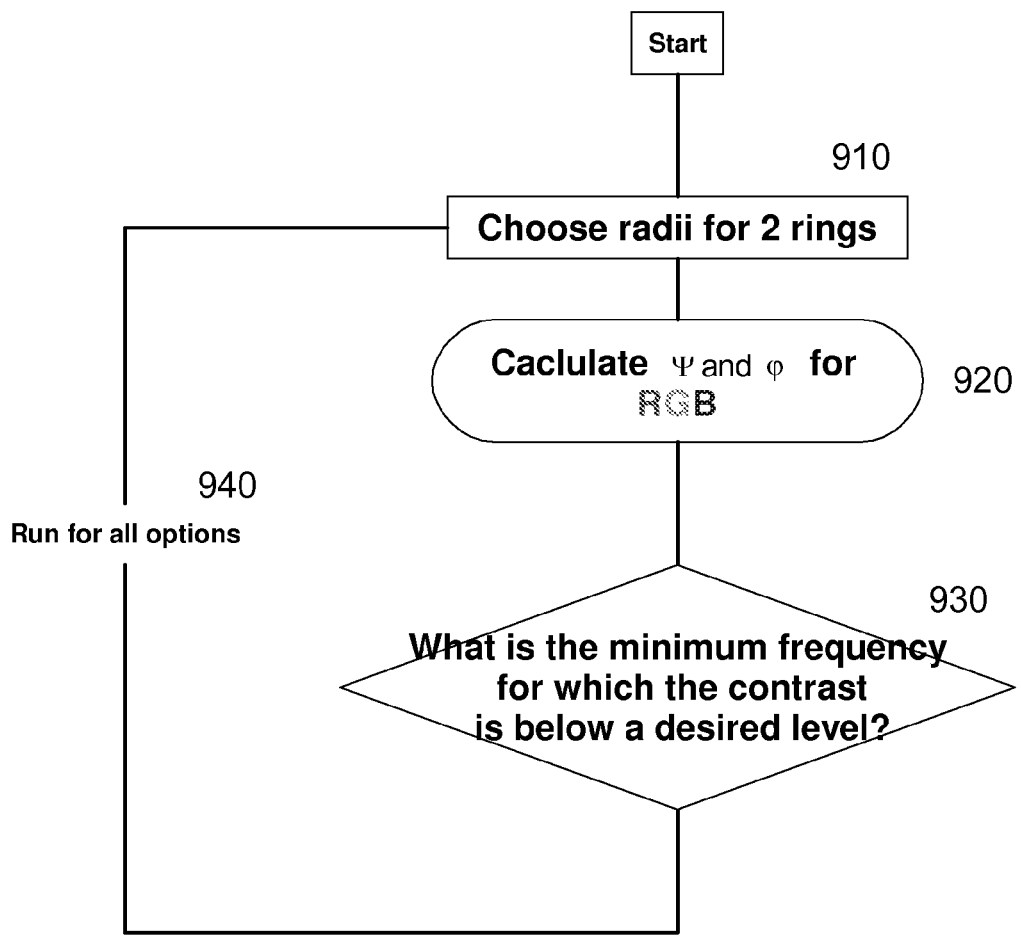
Figure 10:
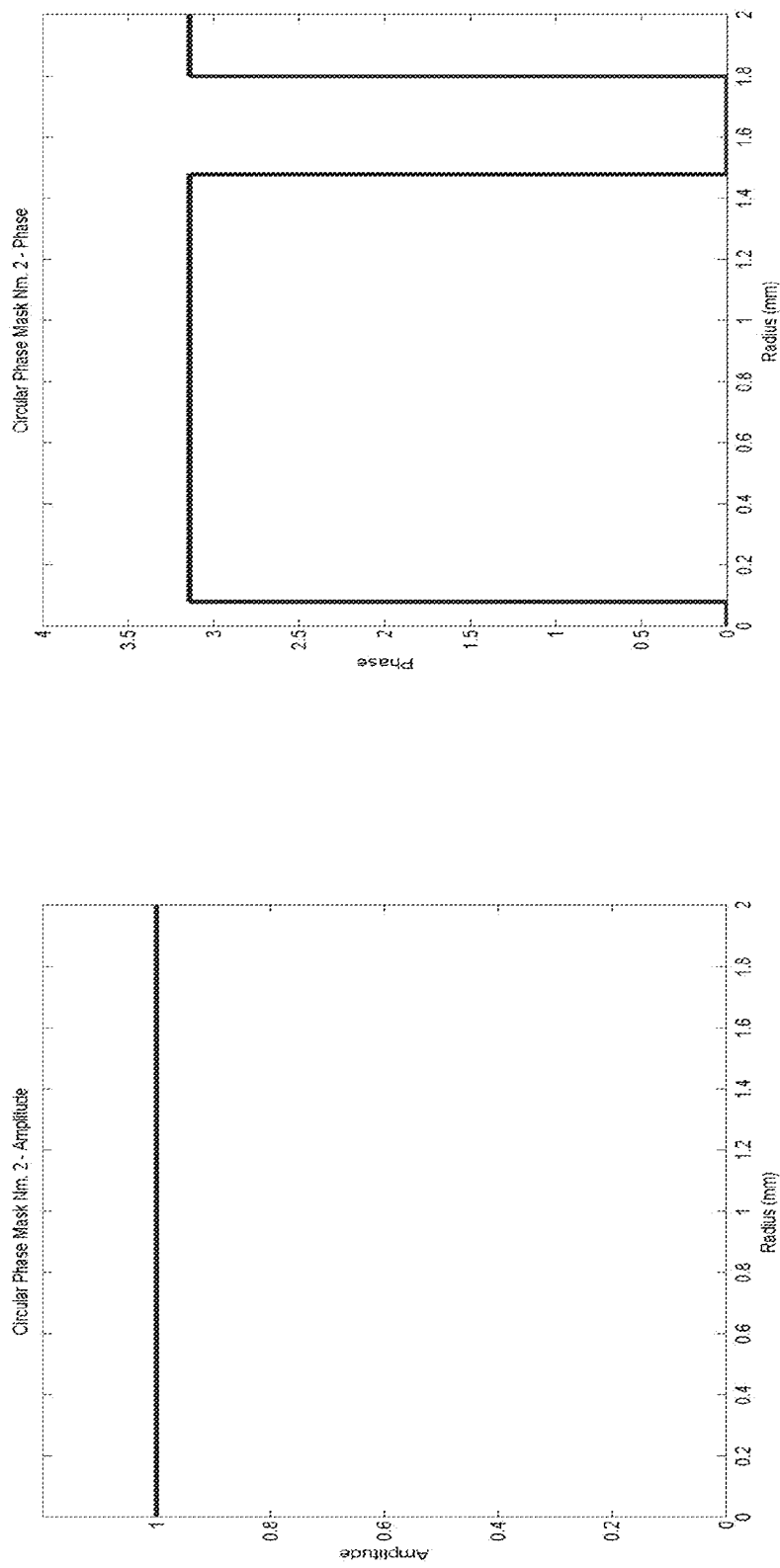
Figure 12A:
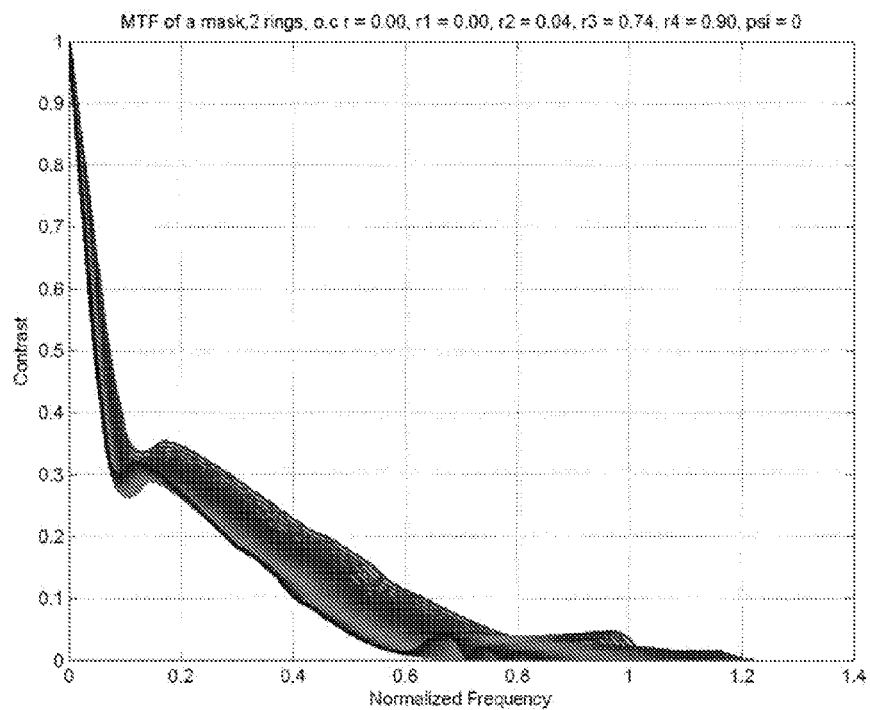
Figure 12B:
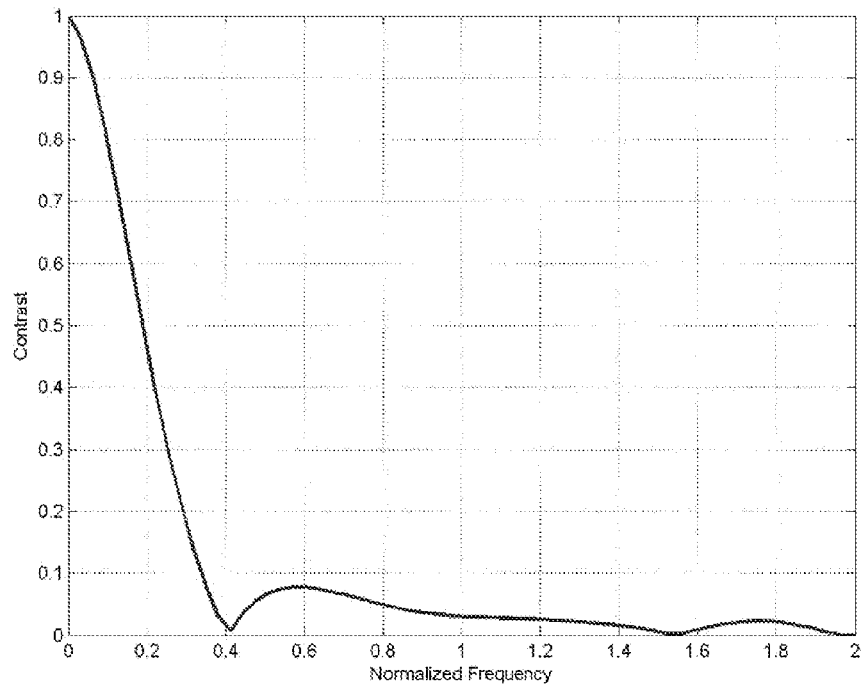
Figure 13A:
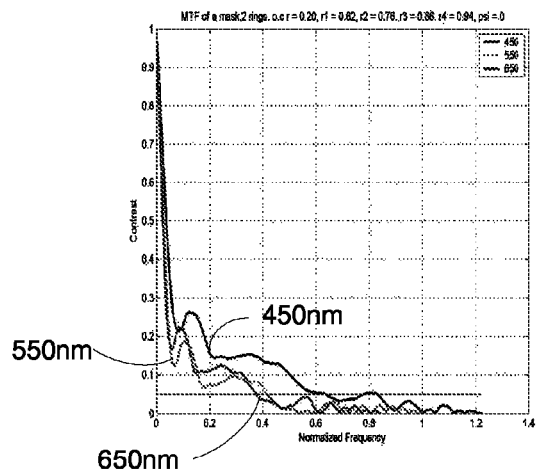
Figure 13B:
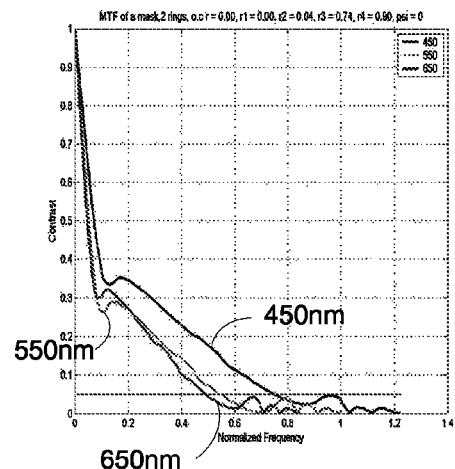
Figure 13C:
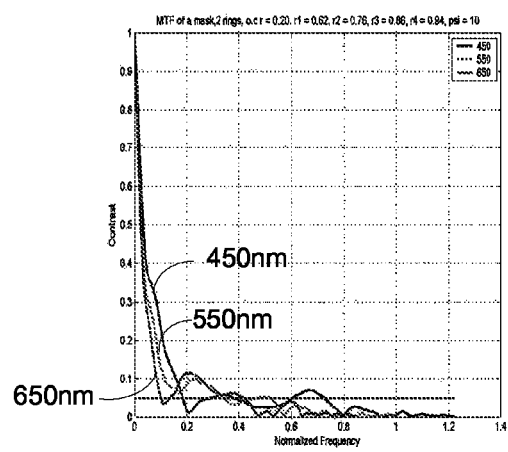
Figure 13D:
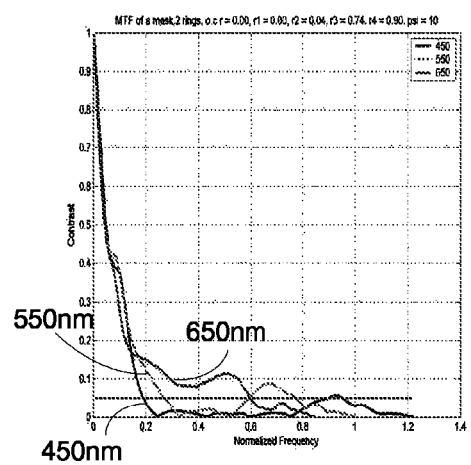
Figure 14:
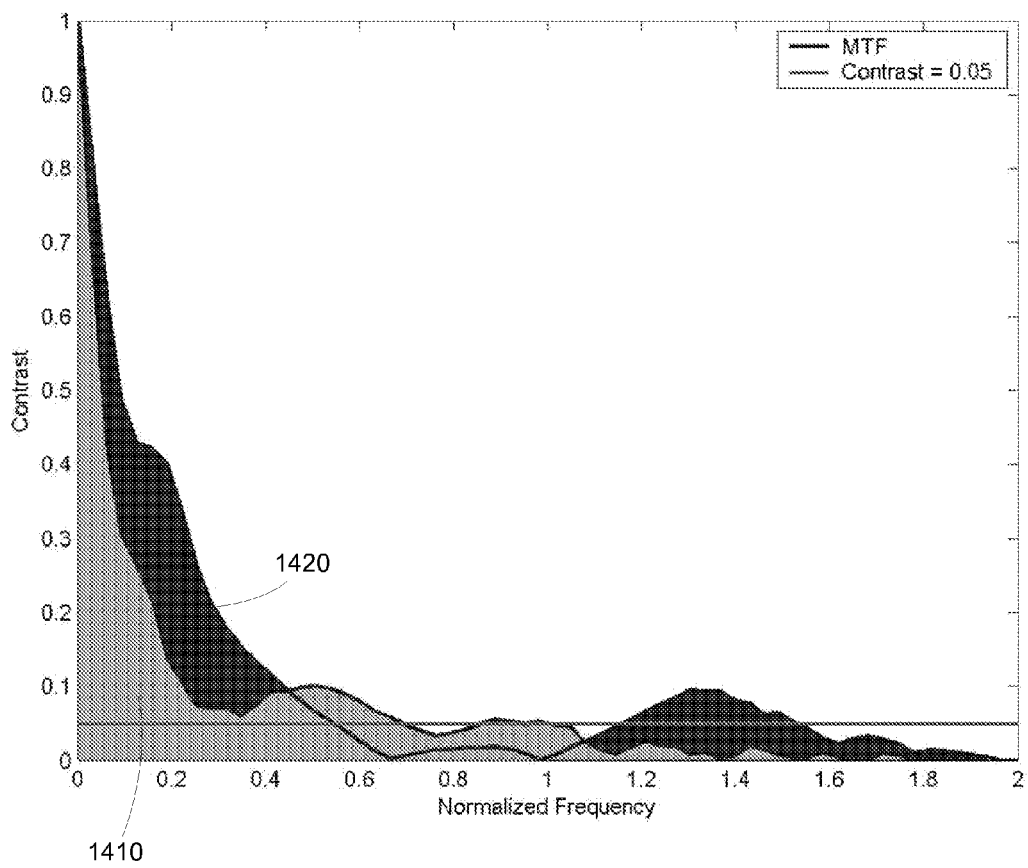

FIGS. 6g-k illustrate MTF curves for an optical system equipped with a mask having four rings, according to an embodiment of the invention;

FIGS. 7a-7c and 8A-8C illustrate sample images acquired by an imaging system following the teachings of this application;

FIG. 9 illustrates a method for defining a polychromatic optimal mask, according to an embodiment of the invention;

FIG. 10 illustrates a polychromatic optimal mask which was optimized for the visible spectra, according to an embodiment of the invention;

FIGS. 11a-11d illustrate MTF curves for a mask having two annular rings, according to an embodiment of the invention;

FIG. 12a illustrates MTF curves for wavelengths between 450 to 680 nm, provided by a mask, according to an embodiment of the invention;

FIG. 12b illustrate MTF curve of a clear aperture, according to an embodiment of the invention;

FIGS. 13a-d illustrate MTF of various masks, according to an embodiment of the invention; and FIG. 14 illustrates MTF curves for various masks, according to an embodiment of the invention.

DETAILED DESCRIPTION OF THE DRAWINGS

Figure 1:
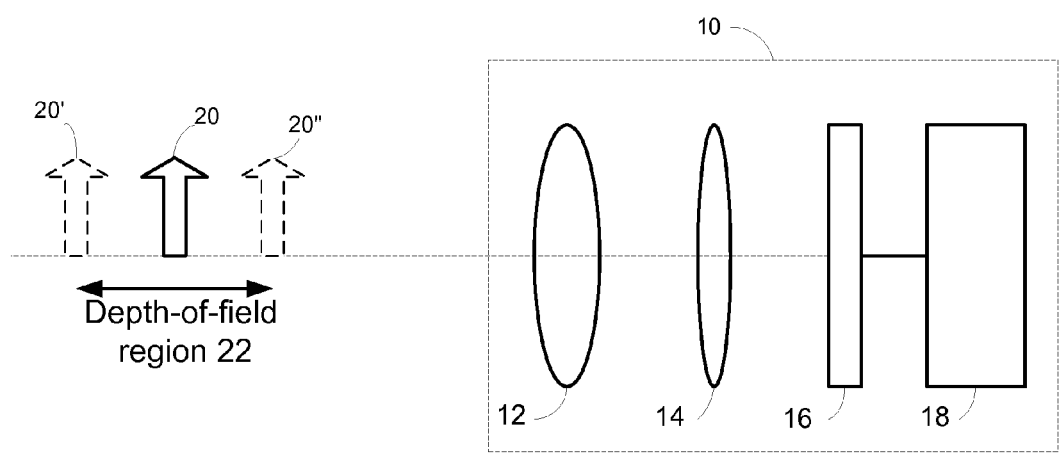

FIG. 1 illustrates imaging system 10 according to an embodiment of the invention. Imaging system 10 includes one or more lenses (represented by convex lens 12) followed by mask 14 and sensor 16. Sensor 16 is connected to processor 18 and can be connected to a memory unit (not shown).

Lens 12 projects a filtered image (filtered by mask 14) of object 20 onto sensor 16. Imaging system 10 can acquire images (of an allowable quality level) of objects that are located within a three dimensional depth-of-field space. Object 20 can be located anywhere in depth-of-field region 22, as illustrated by dashed arrows 20' and 20".

According to an embodiment of the invention mask 14 enables capturing of images even when imaging system 10 is not in-focus and restores the contrast such that image acquired by imaging system 10 has superior qualities for all object positions within the depth-of-field region. It should be noted that the acquisition of images is done without realigning or refocusing the imaging system 10 and as such, there is no need to provide means for axial motion of elements in imaging system 10.

It is noted that mask 14 can include multiple mask elements, each mask element can include one or more rotationally symmetrical regions. If multiple mask elements are used they can be placed in proximate to each other, but this is not necessarily so. For example, when two masks elements are used one mask element can include rotationally symmetrical phase affecting regions while another mask element may include rotationally symmetric amplitude affecting regions. Yet for another example, a single mask element can include both rotationally symmetrical phase affecting regions and rotationally symmetric amplitude affecting regions.

Figure 3:
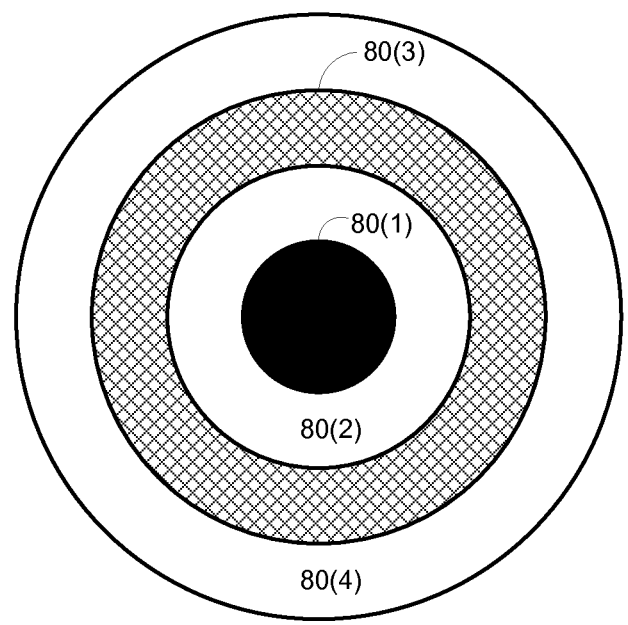
FIG. 3 illustrates a mask according to various embodiment of the invention, such mask having circularly symmetric regions of certain specified phase and amplitude transmission variation.

FIG. 3 illustrates a single mask that includes rotationally symmetric amplitude affecting regions as well as rotationally symmetric phase affecting regions. It is noted that a certain rotationally symmetric region can affect both phase and amplitude and that a rotationally symmetric amplitude affecting region can at least partially overlap a rotationally symmetric phase affecting region. It is noted that a rotationally symmetric amplitude affecting region can be at least partially opaque and/or can attenuate the amplitude of light by a range of attenuation values (for example—it can attenuate light by a factor that ranges between about 1 (full block) to zero (full pass)).

A mask element can be a stand-alone element or can be incorporated onto a lens, another filter, and the like. Mask elements should be positioned along the optical axis of the lens assembly of an imaging system; they can be located at the pupil position but also at other locations, in front or behind the imaging lens.

Referring to FIG. 3, mask 14 includes a central opaque circle 80(1) as well as three concentric rings—non-affecting ring 80(2), phase shifting ring 80(3), and another non-affecting ring 80(4). Non-affecting ring 80(2) does not affect the phase or amplitude of light passing through mask 14. Opaque material can be placed at the space defined between non-affecting ring 80(4) and the perimeters of mask 14. It is noted that the non-affecting ring as well as a phase shifting ring can be transparent. It should be noted that FIG. 3 illustrates just one phase ring and one absorbing sector. A general mask may have more of each type, i.e., more than just one phase ring and more than one amplitude rings, stops, etc.

Mask 14 is rotational symmetric such that it provides equal performance for all orientations of the spatial frequencies (or features) in the object space. The modulation transfer function (MTF) obtainable when mask 14 is incorporated in imaging system 10 is extremely robust exhibiting an almost uniform characteristic for all features orientation and locations anywhere in the depth-of-field region for which mask 14 was designed for.

Processor 18 can process an image acquired by sensor 16 in various manners. For example, processor 18 can perform a blind restoration of the contrast of the acquired image to provide a final image (also referred to as output image) comparable in quality with those obtainable with a system equipped with dynamically changing focus capabilities.

Conveniently, processor 18 applies a contrast restoration algorithm regardless of the position of the object in the depth-of-field region. Conveniently, the restoration algorithm is indifferent to the orientation of the features of the object.

According to an embodiment of the invention, the contrast restoration algorithm substantially compensates for differences between the modulation transfer function defined by mask 14 and desired modulation transfer function such as but not limited to an ideal diffraction limit modulation transfer function. For example, the ideal diffraction limit modulation transfer function has an inverted V shape with a peak at zero spatial frequency. The modulation transfer function defined by mask 14 can include a central peak but it also provides a relatively flat and smooth portion representative of an almost uniform behavior over a wide spatial frequency range.

Assuming that the desired transfer function is the ideal diffraction limit modulation transfer function then the contrast restoration algorithm can multiply each spatial frequency component of an acquired image by a multiplication factor that represents the ratio between the value of the ideal diffraction limit modulation transfer function at that spatial frequency and the value of a universal modulation transfer function obtained (e.g. by an average of different modulation transfer functions provided by mask 14) for different defocus positions, at that spatial frequency.

Conveniently, processor 18 can execute instructions. These instructions can be stored at a computer readable medium. These instructions, when executed by a computer such as processor 18, cause the processor to increase a contrast of an image acquired by optical components that includes a mask and at least one lens; wherein the mask includes multiple rotationally symmetrical regions; wherein the multiple rotationally symmetrical regions are shaped and positioned such as to define a modulation transfer function that is characterized by a substantially uniform response over a spatial frequency range, wherein the substantially uniform response is substantially indifferent to an orientation of features of the object and to a location of the object within a deep depth-of-field region. These instructions are executed after the image has been optically acquired by an imaging system that includes at least a sensor, a lens, and a mask.

Figure 2:
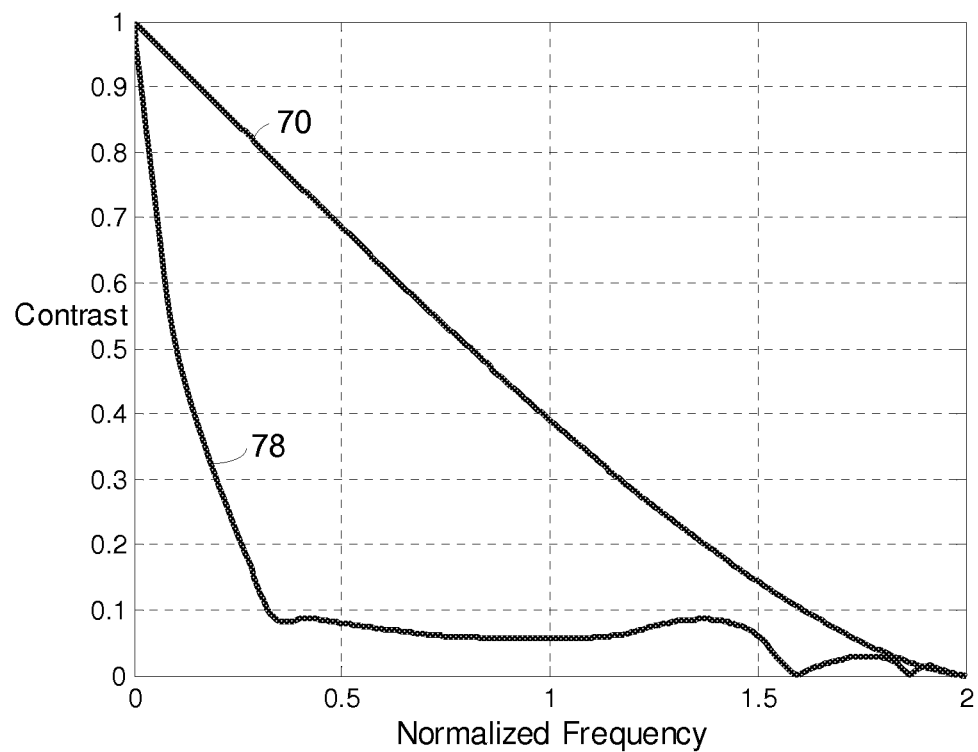
FIG. 2 illustrates a relationship between an ideal diffraction limit modulation transfer function for an object in-focus and a sample modulation transfer function according to an embodiment of the invention and that applies to objects that are in a defocus position.

FIG. 2 illustrates a relationship between ideal diffraction limit modulation transfer function 70 and a sample modulation transfer function 78 according to an embodiment of the invention. Sample modulation transfer function 78 is characterized by a contrast uniformity of above 8% over a normalized spatial frequency range between about 0 and 1.5.

Conveniently, processor 18 preferably executes the contrast restoration algorithm at the spatial frequency domain.

Processor 18 can include one or more processing elements, one or more hardware component, one or more software components, a combination of above, and the like.

Conveniently, processor 18 can easily process images of three-dimensional objects that are located within the depth-of-field region, since the same correction factor is applied simultaneously for all locations within the depth-of-field region.

It is noted that processor 18 is optional and imaging system 10 can output the image acquired by sensor 16. Yet according to another embodiment of the invention, imaging system 10 does not include sensor 16 and the image of the object can be viewed as is by the eye of a user.

Thus, for applications where the need of the contrast restoration algorithm is not required, the user may decide not to apply this algorithm and to use the imaging system as an all-optical imaging system for objects located within the depth-of-field region.

Conveniently, mask 14 can be amplitude and phase circular symmetric mask, or just a phase-only circular symmetric mask. Mask 14 can be incorporated in an optical train represented by convex lens 12 as an added element, or can be integrated with a lens by means of etching, molding, injecting, diffusing, stamping or other fabrication means, such as in diffractive and refractive index modifying operations.

In many optical imaging systems, insensitivity to z-axis motion of components is a prerequisite. Imaging system 10 can adequately acquire images of components that move along the z-axis within the depth of field region.

Mask 14, when incorporated in imaging system 10, exhibits a reduced modulation transfer function that does not change significantly over a wide range of object locations (within the depth-of-field region) for a spatial frequency range that is as large as possible.

Images generated by imaging system 10 exhibit a reduced contrast so that although the spatial frequencies will be properly displayed, the image contrast suffers, in comparison to what can be obtained with a perfect imaging system that can be aligned in an in-focus condition.

The constant (or substantially constant) and smooth shape of the modulation transfer function enables to utilize a simple contrast restoration algorithm that permits restoration of high contrast values, close to what is obtainable when using diffraction limited imaging systems.

The phase component of mask 14 has to be rotationally symmetric. Accordingly, the phase shift introduced by circularly symmetric phase affecting components of mask 14 is substantially pi ($\pi$), or substantially minus pi ($-\pi$). Thus, for at least one light frequency within a possible range of light sensed by sensor 16 the phase shift can be pi. Conveniently, mask 14 includes multiple rotationally symmetrical regions.

The multiple rotationally symmetric regions can include at least one rotationally symmetric amplitude affecting region and at least one rotationally symmetrical phase affecting region. According to an embodiment of the invention mask 14 includes a light absorbing circle positioned at the center of the mask. A rotationally symmetric amplitude affecting region can be fully transparent or opaque, but in general, it may also have partial opacity.

The rotationally symmetrical regions of mask 14 can have an annular shape. Mask 14 can include a single circular shaped region. Mask 14 can include one or more rings of phase each and optionally one or more opaque rings. The design process of mask 14 is greatly simplified by selecting such annular shaped regions, albeit their exact location within the mask is to be determined by the design algorithm.

Mask 14 can be designed by finding the rings (and optionally a central circle) that provides the best modulation transfer function that has the highest spatial cut-off frequency per a desired contrast value for the whole depth of field range. Mask 14 can provide a trade-off between desired contrast values and cut-off spatial frequencies for an object located within (the predefined) depth-of-field region. Lower desired contrast values result in higher spatial cut-off frequencies.

Once the desired contrast value is set, mask 14 can be designed. It is noted that the design process can involve selecting a mask configuration out of multiple possible configurations of the mask. The selection can involve determining, for each possible mask configuration the minimal spatial cut-off frequency that provides at least the desired contrast value for the whole depth of field range can be achieved. After that minimal spatial cut-off frequency is found for each possible mask configuration, the selected mask configuration is the configuration that is characterized by the highest (minimal) spatial cut-off frequency. Conveniently, this includes finding, for each possible mask configuration out of multiple possible mask configurations, a set of maximal spatial cutoff frequencies that assure the desired contrast value; each maximal spatial cutoff frequency corresponds to a certain defocus condition within the depth-of-field range, where the set of defocus positions covers properly the whole depth-of-field range. The lowest (also referred to minimal spatial cut-off frequency)) out of those maximal spatial cutoff frequencies defines the highest spatial cutoff frequency that assures a certain desired contrast value for the whole depth-of-focus range obtainable with the mask configuration.

FIG. 4 is a flow chart of method 100 for acquiring an image, according to an embodiment of the invention.

Method 100 starts by stage 110 of imaging an object (located at an object space) onto a sensor and acquiring an image by the sensor.

Stage 110 includes stage 120 of sensing light from an object wherein the light propagates through at least one lens and through a mask towards to a sensor. The mask includes multiple rotationally symmetric regions. The multiple rotationally symmetric regions are shaped and positioned such as to define a modulation transfer function that is characterized by a substantially uniform response over a spatial frequency range wherein the substantially uniform response is substantially indifferent to an orientation of features of the object and to a location of the object within an extended depth-of-field region.

Conveniently, stage 120 includes sensing light that propagates through at least one rotationally symmetric amplitude affecting region and through at least one rotationally symmetric phase affecting region.

Conveniently, stage 120 includes sensing light that propagates through a mask that includes a light absorbing circle positioned at the center of the mask.

Conveniently, stage 120 includes sensing light that propagates through a mask that includes at least one rotationally symmetric phase affecting region that introduces a phase shift having a value of about pi. One should note that a phase shift of pi does also represent a phase shift of minus pi. Only for such pi phase shift, the section can be considered simultaneously symmetric and antisymmetric, which explains the high performance of such mask for providing image quality performance over an extended depth of field region.

Conveniently, stage 120 includes sensing light that propagates through a mask that is integrated with a lens.

Stage 110 is followed by stage 130 for electrically processing an image acquired by the sensor such as to increase the contrast of the acquired image.

Conveniently, stage 130 can include compensating for differences between the modulation transfer function defined by the mask and a desired modulation transfer function such as but not limited to an ideal diffraction limit modulation transfer function.

Conveniently, stage 130 includes applying a correction algorithm that is indifferent to a location of features in the image space.

Figure 5:
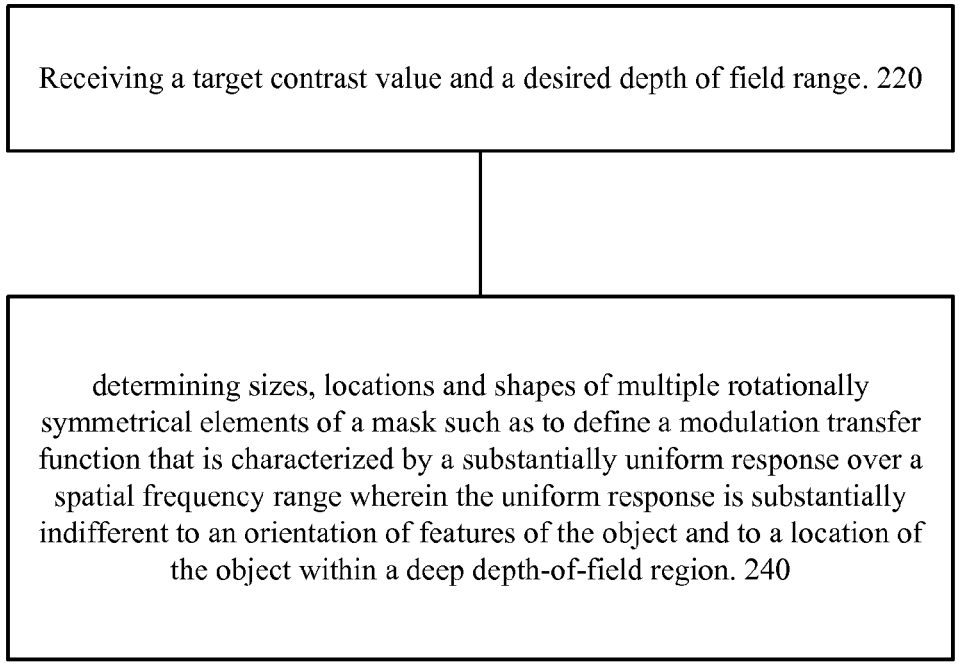
FIG. 5 is a flow chart of a method for designing a mask, according to an embodiment of the invention.

FIG. 5 is a flow chart of method 200 for designing a mask, according to an embodiment of the invention.

It is noted that method 200 allows designing a mask. After the mask is designed, fabricated and included in an imaging system it can be used to generate an image (for example by executing method 100).

Method 200 starts by stage 220 of receiving a desired contrast value.

Stage 220 is followed by stage 240 of determining sizes, locations and shapes of multiple rotationally symmetrical regions of a mask such as to define a modulation transfer function that is characterized by a substantially uniform response over a spatial frequency range wherein the uniform response is substantially indifferent to an orientation of features of the object and to a location of the object within a deep depth-of-field region. Conveniently, the determining provides the maximal spatial frequency range in which at least the desired contrast value is provided for the whole depth of field region.

Conveniently, stage 240 can include: (i) determining a size, a location and a shape of a rotationally symmetric amplitude affecting region and of a rotationally symmetric phase affecting region, (ii) determining a size of a light absorbing circle positioned at the centre of the mask, (iii) determining a size, a location and a shape of a rotationally symmetric phase affecting region that introduces a phase shift having a substantially absolute value of pi, (iv) finding, for each possible mask configuration out of multiple possible mask configurations, a minimal spatial cut-off frequency that provides at least the desired contrast for the whole depth-of-field range; and (v) selecting, out of the multiple possible mask configurations, a selected mask configuration that is characterized by the highest value of the minimal spatial cut-off frequency that provides at least the desired contrast for the whole depth-of-field range. It is noted that stage 240 (iv) includes finding, for each possible mask configuration out of multiple possible mask configurations, a set of maximal spatial cutoff frequencies that assure the desired contrast value; each maximal spatial cutoff frequency corresponds to a certain defocus condition within the depth-of-field range, where the set of defocus positions covers properly the whole depth-of-field range. The lowest (also referred to minimal spatial cut-off frequency)) out of those maximal spatial cutoff frequencies defines the highest spatial cutoff frequency that assures a certain desired contrast value for the whole depth-of-focus range obtainable with the mask configuration.

It is noted that one or more modulation transfer functions may be implanted, which may be characterized by substantially uniform responses over the spatial frequency range for substantially one wavelength (e.g. 550 nm), for a range of wavelengths (e.g. 550-600 nm), or for several distant wavelengths and/or ranges (e.g. 400, 450, and 700-750 nm). It is noted that while the given examples are all within the visible spectrum, the modulation transfer functions may also pertain to other part of the electromagnetic spectrum (e.g. IR, UV, and so forth), depending on the imagery requirements.

According to an embodiment of the invention, the determining may include determining sizes, locations and shapes of multiple rotationally symmetric regions of the mask such as to define multiple modulation transfer functions that are characterized by substantially uniform responses over a spatial frequency range of light of different colors. According to an embodiment of the invention, the determining may further include determining the sizes, locations and shapes of the multiple rotationally symmetric regions of the mask such as to ensure a substantially uniform responses for the different colors.

Thus, according to an embodiment of the invention, stage 240 may include: (i) determining a size, a location and a shape of a rotationally symmetric amplitude affecting region and of a rotationally symmetric phase affecting region, (ii) determining a size of a light absorbing circle positioned at the centre of the mask, (iii) determining a size, a location and a shape of a rotationally symmetric phase affecting region that introduces a phase shift having a substantially absolute value of pi, (iv) finding, for each possible mask configuration out of multiple possible mask configurations, minimal spatial cut-off frequencies that provide at least the desired contrast for the whole depth-of-field range, for multiple wavelengths and/or wavelength ranges; and (v) selecting, out of the multiple possible mask configurations, a selected mask configuration that is characterized by the highest value of the minimal spatial cut-off frequency that provides at least the desired contrast for the whole depth-of-field range, for the different wavelengths.

It is noted that stage 240 (iv) may include finding, for each possible mask configuration out of multiple possible mask configurations, a set of maximal spatial cutoff frequencies that assure the desired contrast value over the multiple wavelengths and/or wavelength ranges; each maximal spatial cut-off frequency corresponds to a certain defocus condition within the depth-of-field range, where the set of defocus positions covers properly the whole depth-of-field range.

The following illustrates some examples of modulation transfer functions. It is assumed that the desired contrast value is at least about 5%. Such desired contrast value is high enough to overcome the noise that is present in acquired images and low enough to provide a large depth-of-field. It is noted that other desired contrast values can be provided and that the mentioned above value is only a sample value selected for illustrating the following validation.

A defocus parameter ψ (also referred to as psi) is a convenient way to define the out-of-focus location of the input object. Psi provides the maximal phase deviation of an actual wave front for that out-of-focus position, from an ideal one obtained for the case of in-focus position, calculated at the exit pupil edge.

The defocus parameter is provided in the paraxial regime, by the expression:

$$\psi = \frac{\pi R^2}{\lambda}\left(\frac{1}{d_{obj}} + \frac{1}{d_{img}} - \frac{1}{f}\right)$$

where R is the radius of the aperture, is the wavelength, f is the focal length, $d_{obj}$ is the distance between the first principal plane and the object, and $d_{img}$ is the distance between the second principal plane and the detector plane.

Assuming that a defocus parameter of |ψ|<8 should be allowed by a mask that includes one phase ring and one amplitude ring. The amplitude ring was actually a circle that is centered at the center of the mask and as such, it is essentially a "central stop."

FIGS. 6a-6f illustrate various modulation transfer functions obtained for different values of ψ—0, 2, 4, 6, 8 and 10.

Figure 6A:
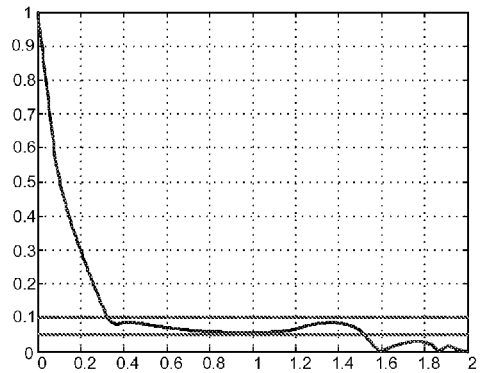
FIGS. 6a-6f illustrate multiple modulation transfer functions according to an embodiment of the invention.

FIG. 6a illustrates a modulation transfer function obtained for ψ=0 and has a contrast uniformity of above 10% over a normalized spatial frequency range between about 0 and 0.3. For contrast of above 5%, the normalized spatial frequency range is between 0 and 1.5.

Figure 6B:
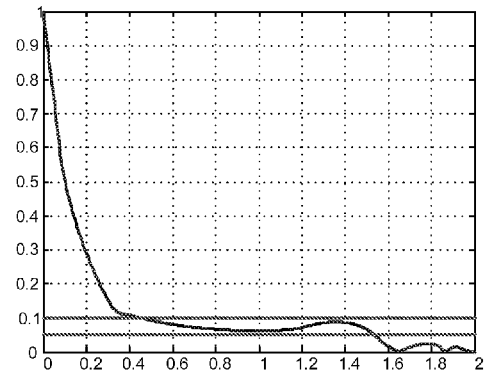

FIG. 6b illustrates a modulation transfer function obtained for and has a contrast uniformity of above 10% over a normalized spatial frequency range between about 0 and 0.42. For contrast of above 5%, the normalized spatial frequency range is between 0 and 1.52.

Figure 6C:
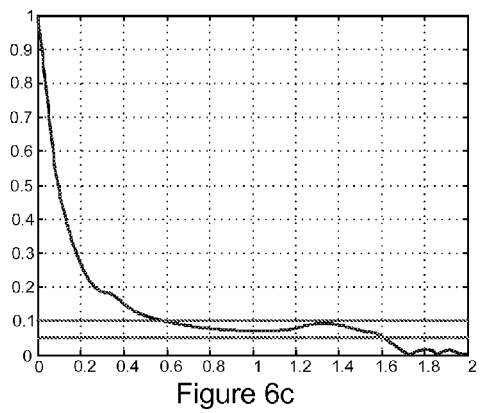

FIG. 6c illustrates a modulation transfer function obtained for and has a contrast uniformity of above 10% over a normalized spatial frequency range between about 0 and 0.6. For contrast of above 5%, the normalized spatial frequency range is between 0 and 1.8.

Figure 6D:
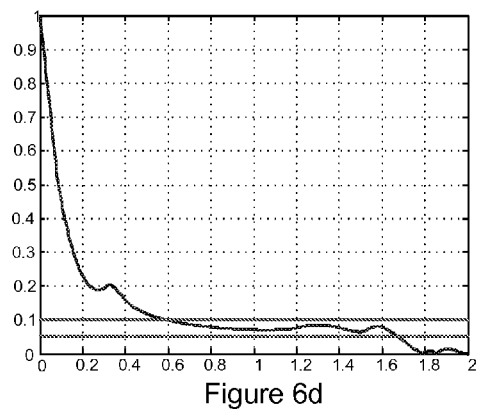

FIG. 6d illustrates a modulation transfer function obtained for and has a contrast uniformity of above 10% over a normalized spatial frequency range between about 0 and about 0.55. For contrast of above 5%, the normalized spatial frequency range is between 0 and 1.87.

Figure 6E:
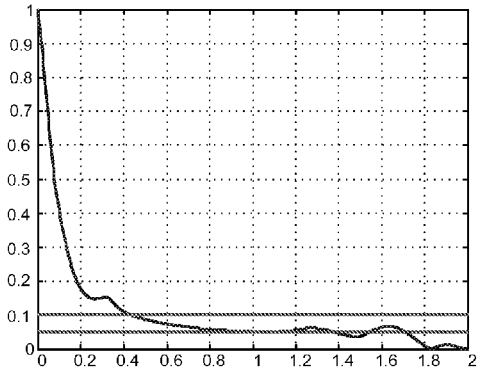

FIG. 6e illustrates a modulation transfer function obtained for and has a contrast uniformity of above 10% over a normalized spatial frequency range between about 0 and 0.42. For contrast of above 5%, the normalized spatial frequency range is between 0 and 1.3.

Figure 6F:
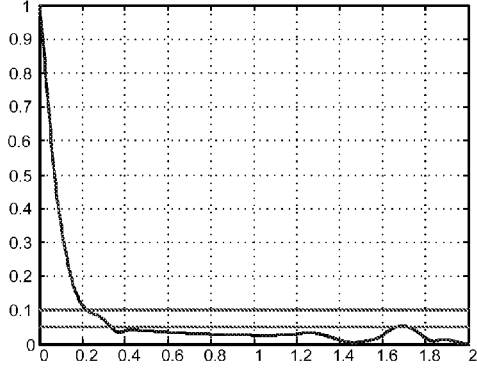
Figure 6G:
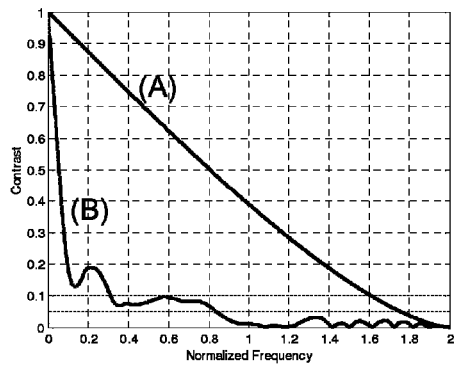
Figure 6J:
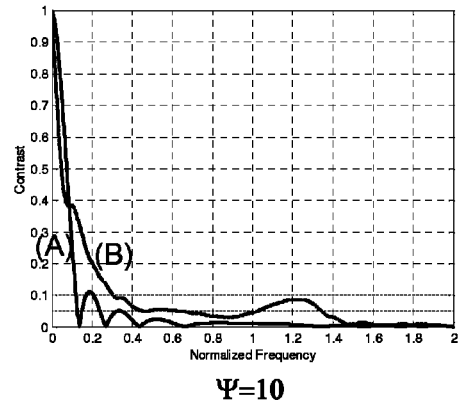
Figure 6H:
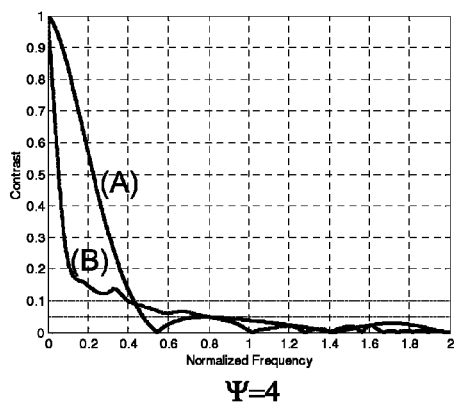
Figure 6K:
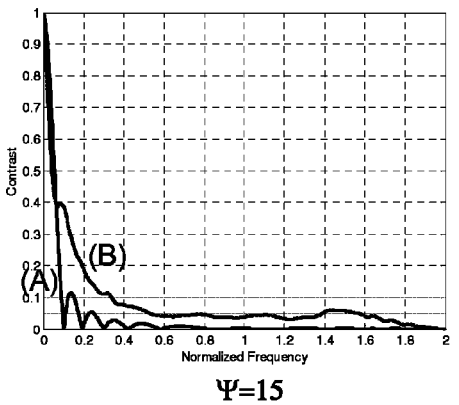
Figure 6I:
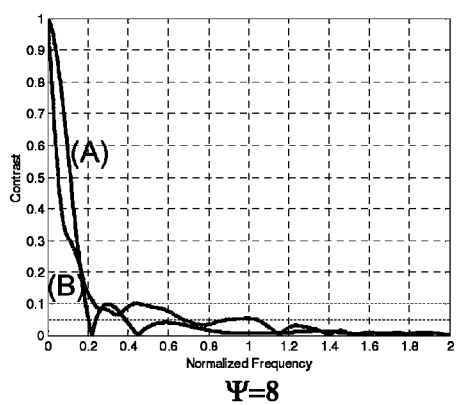

FIG. 6f illustrates a modulation transfer function obtained for ψ=15 and has a contrast uniformity of above 10% over a normalized spatial frequency range between about 0 and 0.22. For contrast of above 5%, the normalized spatial frequency range is between 0 and 0.32.

Inspection of the modulation transfer functions calculated for the ψ=8 case, readily reveals that the modulation transfer function exhibits a contrast value larger than 0.05 for any object location, within the range defined by |ψ|<8, as long as the spatial frequency does not exceed a value of 1.4, or 70% of the diffraction limit of perfectly aligned optical imaging systems.

Moreover, these modulation transfer function curves are very similar to one another and one can construct a "universal curve" representing the maximum contrast level obtained at each frequency, anywhere within the range defined by |ψ|<8, or by any other method, such as averaging. It is now possible to apply a correcting algorithm whereby each frequency component will be enhanced by the ratio of the ideal diffraction limit MTF curve to the universal curve.

Applying such filtering operation to images acquired with the optical system encompassing the mask described above, generates an improved image exhibiting high resolution as well as high contrast as demonstrated in FIGS. 7a-7c and 8a-8c (bottom pictures).

FIGS. 6g-k illustrate several MTF curves, calculated for different values of ψ for an optical system equipped with a mask having four rings, the radii of which were obtained as 0.62, 0.76, 0.82, and 0.94 respectively, for wavelength of 550 nm.

Each of the MTF curves illustrated in FIGS. 6g-k pertains to the above identified mask, which was optimized for single wavelength, (denoted as curve B in the illustrations) at several defocus positions, along with the corresponding MTF curves provided by a full size open aperture at same defocus conditions (denoted as curve A in the illustrations). The contrast values of 5% and 10% are highlighted in all of FIGS. 6g-k by highlighted horizontal lines.

While this mask was optimized for substantially a single wavelength, over masks may be designed for multiple colors (may also be referred to as "polychromatic optimal mask"). The designing of such masks takes into consideration proper operation for wider light spectrum (e.g. the whole visible spectra). The designing may take into account the variations in the phase values provided by the mask for the various wavelengths in the entire destination range, and their influence.

For example, method 900 which may be used—according to an embodiment of the invention—in order to define a polychromatic optimal mask is illustrated in FIG. 9.

Method 900 may include with stage 910 of choosing radii for a number of rings (e.g. two. It is noted that the algorithm may be iterated for different number of rings, until finding the optimal number). Method 900 may continue with stage 920 of calculating ψ, and/or φ for multiple wavelengths and/or wavelength ranges (e.g. for wavelengths corresponding to the colors red, green, and blue).

Method 900 may continue with stage 930 of determining a minimum frequency for which the contrast is below a desired level.

Method 900 may include iteration (denoted 940) of stages 910, 920, and 930 for different sets of radii, until determining the desired radii in response to the results of stage 930 for different radii.

FIG. 10 illustrates a polychromatic optimal mask which was optimized for the visible spectra, using wavelengths corresponding to red—650 nm, green—550 nm, and blue—450 nm, has two annular rings having radii of 0.04-0.74, 0.9-1 respectively.

FIGS. 11a-11d illustrate MTF curves for the polychromatic optimal mask of FIG. 10 (having two annular rings having radii of 0.04-0.74, 0.9-1) calculated at different values of ψ: 0, 2, 5, and 8.

The MTF curves FIGS. 11a-d are provided for several defocus positions, and are calculated for three different wavelengths—blue, green and red, (a) in-focus condition, ψ=0; (b) ψ=2; (c)ψ=5; (d) ψ=8; The contrast value of 5% is marked by a highlighted horizontal line.

The design of such polychromatic optimal mask makes sure that the contrast, at every wavelength, is above the minimum desired level for the entire destination spectrum.

FIG. 12a illustrates MTF curves for all wavelengths between 450 to 680 nm, provided by the mask of FIG. 10 for ψ=4 and FIG. 12b illustrate MTF curve of a clear aperture for the same condition.

Masks that are optimized for multiple wavelengths enable extending of depth of field of imaging systems while maintaining reliable color rendition. By way of example, the contrast at each wavelength may be above a value of 5% for high frequencies and above 25% for low frequencies. Thus, such polychromatic optimal masks provide better results for color imagery in particular.

It is noted that method 200 can be executed by a mask design system. Additionally or alternatively, method 200 can be represented by instructions stored on a computer readable medium. These instructions, once executed by a computer, cause the computer to execute various stages of method 200. The computer can be a server, a lap top computer, a desktop computer, and the like.

Conveniently, a computer readable medium is provided. The computer readable medium stores instructions that when executed by a computer cause the computer to: receive a desired contrast value; and determine sizes, locations and shapes of multiple rotationally symmetric regions of a mask such as to define a modulation transfer function that is characterized by a substantially uniform response over a spatial frequency range; wherein the uniform response is substantially indifferent to an orientation of features of the object and to a location of the object within a deep depth-of-field region. It is noted that these instructions can be executed during a mask design phase. After the mask is designed, fabricated and included in an imaging system it can be used to generate an image.

Conveniently, the determining provides the maximal spatial frequency range in which at least the desired contrast value is provided for the whole depth of field region.

The mentioned above computer readable medium can be a disk, a diskette, a tape, a memory chip, a smart card and the like. The instructions stored in the computer readable medium can be read by using electron beams, magnetic fields, light beams, and the like.

Conveniently, a mask design system is provided. It includes a memory unit adapted to store a desired contrast value; and a processor that is adapted to determine sizes, locations and shapes of multiple rotationally symmetric regions of a mask such as to define a modulation transfer function that is characterized by a substantially uniform response over a spatial frequency range; wherein the uniform response is substantially indifferent to an orientation of features of the object and to a location of the object within a deep depth-of-field region. It is noted that the mask design system can design a mask. After the mask is designed, fabricated and included in an imaging system it can be used to generate an image.

Conveniently, the determining provides the maximal spatial frequency range in which at least the desired contrast value is provided for the whole depth of field region.

Figure 7A:
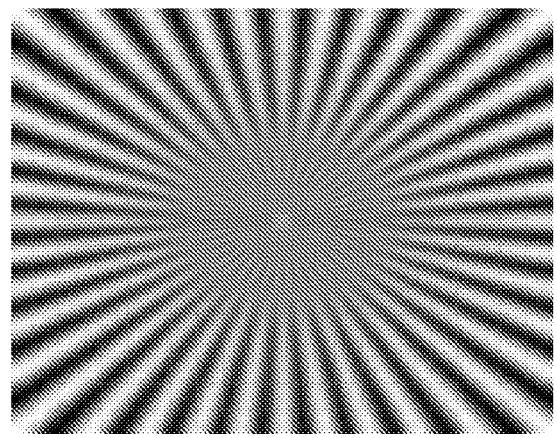
Figure 7B:
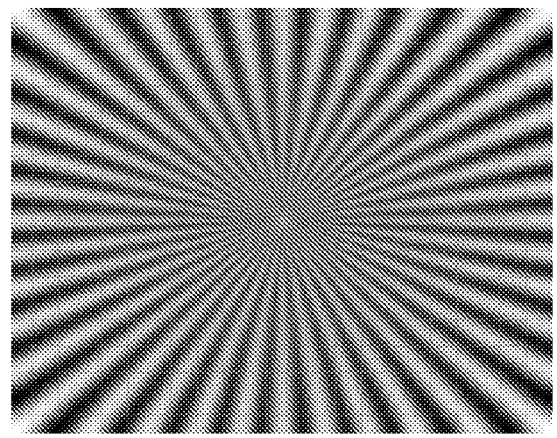
Figure 7C:
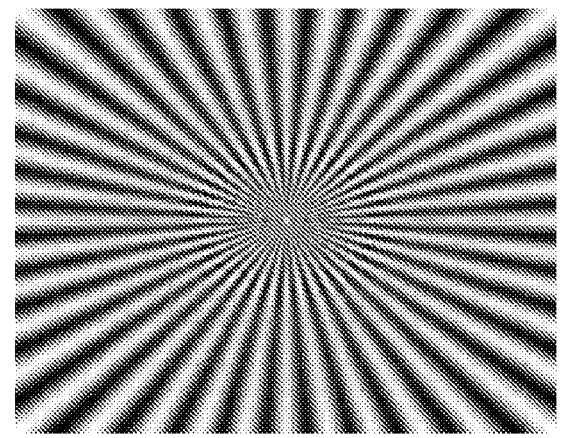

FIG. 7a is an image of a spoke target located in a defocus position corresponding to Psi=8 acquired by an imaging system that does not include the mask. FIG. 7b is an image of a spoke target positioned at the same location, but acquired by an imaging system that includes the mask without electronically processing the acquired image. FIG. 7c is an image of same spoke target acquired by an imaging system after applying the contrast restoration algorithm. The spoke target is characterized by features of different orientations. It can be clearly seen from FIG. 7b that the optical response is indifferent to the orientation of the features as images of these features are substantially equal to each other.

Figure 8A:
Figure 8B:
Figure 8C:

FIG. 8a is an image of a gray level target (known as Lena) acquired by an imaging system that does not include the mask. FIG. 8b is an image of a gray level target (known as Lena) acquired by an imaging system that includes the mask but without electronically processing the acquired image. FIG. 8c is an image of a gray level target (known as Lena) acquired by an imaging system after applying the contrast restoration algorithm. In all these three figures the gray level target (Lena) was positioned at an out of focus location, defined as corresponding to Psi=8.

Although the demonstration was done for a noise free image, the technique is equally useful for images corrupted by additive noise.

It is noted that according to various embodiments of the invention, masks may be designed according to specifications/requirement of system in which this masks will be implemented. For example, according to an embodiment of the invention, when the system require only a moderate DOF capability, the mask can be designed for low ψ operation, thus exhibiting higher contrast values, often eliminating the need for post processing.

Another advantage of the masks optimized for multiple wavelengths, e.g. as exemplified above, is that in situations/system in which large DOF is not required, masks may be designed for a limited range of LP, which exhibit increased contrast at low frequencies.

Comparing to masks which are optimized for a single wavelength (e.g. 550 nm), polychromatic optimal masks that are optimized for multiple wavelength are better than the masks optimized for the single wavelength in that range, since it is possible to get almost half of the contrast which is achieved by a clear aperture, e.g. as exemplified in FIGS. 13a-d.

FIGS. 13a and 13c illustrate MTF of the mask of FIGS. 6g-k having four rings, the radii of which were obtained as 0.62, 0.76, 0.82, and 0.94 (designed for wavelength of 550 nm), and FIGS. 13b and 13d illustrate MTF of the polychromatic optimal mask of FIG. 10 having two rings with radii of 0.04-0.74, 0.9-1 respectively (designed for 650 nm, 550 nm, and 450 nm).

FIGS. 13a and 13b correspond to ψ=0 while FIGS. 13c and 13d correspond to ψ=10.

It is noted that when large values of L are required (thus providing large DOF regions), the difference between the two aforementioned masks is much reduced (as may difference between other mask designed for substantially a single wavelength to one designed for many).

By way of example For ψ>9, the mask of FIGS. 6g-k provides a contrast value of 5%, only for illuminations at green wavelength.

FIG. 14 illustrates MTF curves for the mask of FIGS. 6g-k (denoted 1410) and of the mask of FIG. 10 (Denoted 1420) for ψ=4:

Variations, modifications, and other implementations of what is described herein will occur to those of ordinary skill in the art, without departing from the spirit and the scope of the invention as claimed.

Accordingly, the invention is to be defined not by the preceding illustrative description but instead by the spirit and scope of the following claims.

We claim:

1. An optical imaging system comprising: a mask that comprises multiple rotationally symmetrical regions; wherein the multiple rotationally symmetrical regions are shaped and positioned such as to define a modulation transfer function that is characterized by a substantially uniform response over a spatial frequency range wherein the substantially uniform response is substantially indifferent to an orientation of features of the object and to a location of the object within a deep depth-of-field region; wherein the modulation transfer function is above 5% over a normalized frequency range that ranges between zero and at least 1.3 for defocus parameter values that range between zero and 8; wherein a normalized frequency equals a spatial frequency divided by a diffraction limit of a perfectly aligned optical imaging system.

2. An optical imaging system comprising: a mask that comprises multiple rotationally symmetrical regions; wherein the multiple rotationally symmetrical regions are shaped and positioned such as to define a modulation transfer function that is characterized by a substantially uniform response over a spatial frequency range, wherein the substantially uniform response is substantially indifferent to an orientation of features of the object and to a location of the object within a deep depth-of-field region; wherein the modulation transfer function changes by up to 5% within a normalized frequency range that ranges between 0.3 and 1.3 for a defocus parameter of zero, wherein a normalized frequency equals a spatial frequency divided by a diffraction limit of a perfectly aligned optical imaging system.

3. An optical imaging system comprising: a mask that comprises multiple rotationally symmetrical regions; wherein the multiple rotationally symmetrical regions are shaped and positioned such as to define a modulation transfer function that is characterized by a substantially uniform response over a spatial frequency range, wherein the substantially uniform response is substantially indifferent to an orientation of features of the object and to a location of the object within a deep depth-of-field region; wherein the modulation transfer function changes by up to 5% within a normalized frequency range that ranges between 0.4 and 1.5 for a defocus parameter of 2, wherein a normalized frequency equals a spatial frequency divided by a diffraction limit of a perfectly aligned optical imaging system.

4. An optical imaging system comprising: a mask that comprises multiple rotationally symmetrical regions; wherein the multiple rotationally symmetrical regions are shaped and positioned such as to define a modulation transfer function that is characterized by a substantially uniform response over a spatial frequency range, wherein the substantially uniform response is substantially indifferent to an orientation of features of the object and to a location of the object within a deep depth-of-field region; wherein the modulation transfer function changes by up to 5% within a normalized frequency range that ranges between 0.6 and 1.6 for a defocus parameter of eight, wherein a normalized frequency equals a spatial frequency divided by a diffraction limit of a perfectly aligned optical imaging system.

5. A mask, comprising multiple rotationally symmetric regions; wherein the multiple rotationally symmetric regions are shaped and positioned such as to define a modulation transfer function that is characterized by a substantially uniform response over a spatial frequency range regardless of an orientation of features in an object space; wherein the modulation transfer function is above 5% over a normalized frequency range that ranges between zero and at least 1.3 for defocus parameter values that range between zero and 8; wherein a normalized frequency equals a spatial frequency divided by a diffraction limit of a perfectly aligned optical imaging system.

6. A mask, comprising multiple rotationally symmetric regions; wherein the multiple rotationally symmetric regions are shaped and positioned such as to define a modulation transfer function that is characterized by a substantially uniform response over a spatial frequency range regardless of an orientation of features in an object space; wherein the modulation transfer function changes by up to 5% within a normalized frequency range that ranges between 0.3 and 1.3 for a defocus parameter of zero, wherein a normalized frequency equals a spatial frequency divided by a diffraction limit of a perfectly aligned optical imaging system.

7. A mask, comprising multiple rotationally symmetric regions; wherein the multiple rotationally symmetric regions are shaped and positioned such as to define a modulation transfer function that is characterized by a substantially uniform response over a spatial frequency range regardless of an orientation of features in an object space; wherein the modulation transfer function changes by up to 5% within a normalized frequency range that ranges between 0.4 and 1.5 for a defocus parameter of 2, wherein a normalized frequency equals a spatial frequency divided by a diffraction limit of a perfectly aligned optical imaging system.

* * * * *